(12) United States Patent
Alvaro et al.

(10) Patent No.: US 6,225,775 B1
(45) Date of Patent: May 1, 2001

(54) SYNCHRONOUS ELECTRIC MOTOR

(75) Inventors: Nicolino Alvaro, Turin; Sebastiano Acquaviva, Pino Torinese, both of (IT)

(73) Assignee: Plaset Spa (IT)

( * ) Notice: Subject to any disclaimer, the term of this patent is extended or adjusted under 35 U.S.C. 154(b) by 0 days.

(21) Appl. No.: 09/411,604

(22) Filed: Oct. 1, 1999

(30) Foreign Application Priority Data

Oct. 1, 1998 (IT) .............................................. TO98A0825

(51) Int. Cl.$^7$ ....................................................... H02P 1/24
(52) U.S. Cl. ............................................. 318/727; 318/700
(58) Field of Search ................................. 318/727, 701, 318/254, 700

(56) References Cited

U.S. PATENT DOCUMENTS

| | | | | |
|---|---|---|---|---|
| 4,616,165 | * | 10/1986 | Compter | 318/701 |
| 4,678,972 | * | 7/1987 | Lehnhoff et al. | 318/254 |
| 4,698,562 | * | 10/1987 | Gale et al. | 318/254 |
| 4,769,581 | | 9/1988 | Rilly | 318/254 |
| 4,791,341 | | 12/1988 | Brown et al. | 318/809 |
| 4,818,922 | * | 4/1989 | Sears et al. | 318/313 |
| 4,958,118 | * | 9/1990 | Pottebaum | 318/727 |
| 5,764,019 | * | 6/1998 | Webster | 318/701 |

FOREIGN PATENT DOCUMENTS

| | | | | |
|---|---|---|---|---|
| 0574823A2 | 6/1993 | (EP) | ................................ | H02P/1/46 |
| 0682404A2 | 4/1995 | (EP) | ................................ | H02P/5/40 |
| 0851570A1 | 12/1997 | (EP) | ................................ | H02P/6/08 |

* cited by examiner

Primary Examiner—Robert E. Nappi
Assistant Examiner—Rina I. Duda
(74) Attorney, Agent, or Firm—Howrey Simon Arnold & White, LLP

(57) ABSTRACT

The motor comprises a rotor with permanent magnets with at least one pair of poles, a stator having a winding wound around a magnetic circuit, position-detectors for providing driving signals in dependence on the angular position of the rotor, and a driver circuit for controlling the flow of current in the stator winding in dependence on the signals supplied by the position-detectors. The winding is divided into a first half-winding and a second half-winding wound around the magnetic circuit in opposite directions. The driver circuit comprises first and second controlled switches in series with the first stator half-winding and with the second stator half-winding, respectively, in respective circuit branches arranged in parallel between the supply terminals. These switches have respective control inputs connected to the position-detectors in an arrangement such that, during steady-state operation, respective unidirectional currents having a frequency equal to half of the frequency of the alternating supply voltage flow through the half-windings alternately.

11 Claims, 3 Drawing Sheets

SYNCHRONOUS ELECTRIC MOTOR

BACKGROUND OF THE INVENTION

The present invention relates to a synchronous electric motor.

More specifically, the subject of the invention is a single-phase synchronous electric motor comprising:

- a rotor or inductor with permanent magnets, with at least one pair of poles,
- a stator or armature having a winding wound around a magnetic circuit,
- position-detecting means associated with the rotor for providing driving signals in dependence on the angular position of the rotor, and
- a driver circuit connected to the detecting means and to the stator winding and having a pair of terminals for connection to an alternating voltage supply, the driver circuit being arranged to control the flow of current in the stator winding in dependence on the signals supplied by the position-detecting means.

Synchronous motors of this type are characterized in that, during steady-state operation, the angular velocity ω (in revolutions/minute) is related to the frequency f of the alternating supply voltage (in Hz) and to the number p of pairs of poles by the known equation:

$$\omega = f \cdot 60/p$$

Thus, for example, a single-phase synchronous motor with two poles (p=1) supplied with a 50 Hz alternating voltage rotates, during steady-state operation, at an angular velocity ω=3000 revolutions/minute.

A synchronous electric motor with 4 poles (p=2), also supplied with a 50 Hz alternating voltage, rotates, during steady-state operation, at an angular velocity of 1500 revolutions/minute.

SUMMARY OF THE INVENTION

An object of the present invention is to provide a synchronous electric motor of the type specified above having, in general p (p=1, 2 . . . ) pairs of poles but having, during steady-state operation, a synchronism rate of revolution equal to that of a motor with 2p poles.

This and other objects are achieved, according to the invention, by a synchronous electric motor, the main characteristics of which are defined in appended claim 1.

BRIEF DESCRIPTION OF THE DRAWINGS

Further characteristics and advantages of the invention will become clear from the following detailed description, given with reference to the appended drawings, in which.

DETAILED DESCRIPTION OF THE INVENTION

Figure 1:
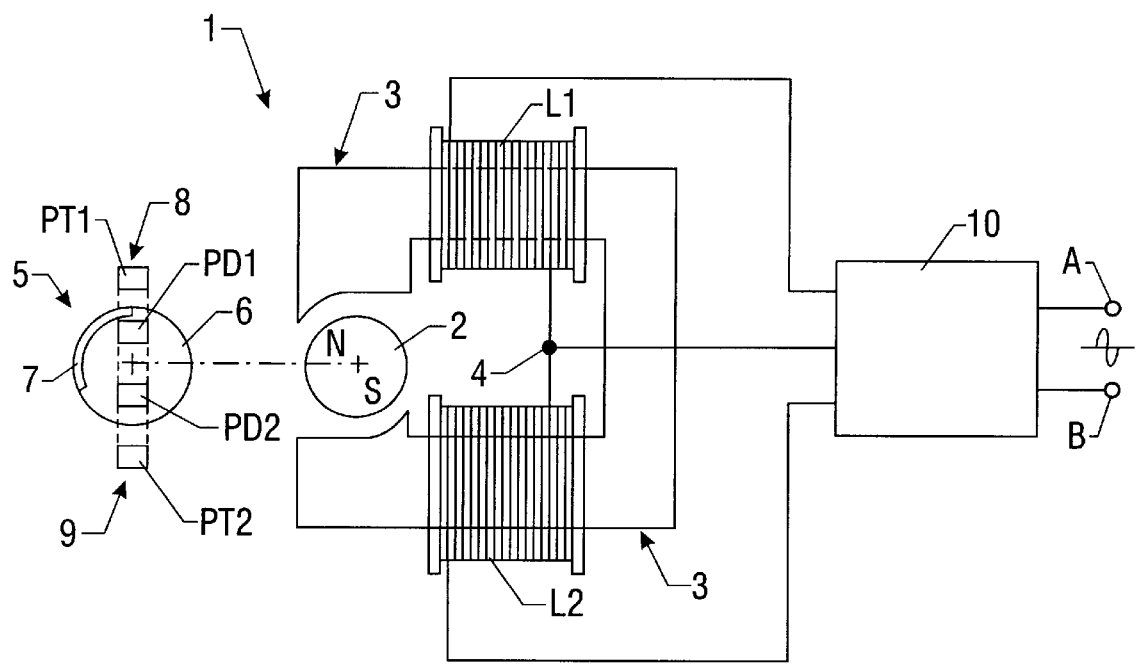
FIG. 1 is a schematic view of a synchronous electric motor according to the invention.

With reference to FIG. 1, a single-phase, synchronous electric motor 1 according to the invention comprises a rotor or inductor 2 with permanent magnets with (at least) one pair of poles. The rotor 2 is mounted for rotating relative to a stator comprising an assembly of plates 3 around which is wound a winding formed by two half-windings L1 and L2, interconnected at 4. In the embodiment shown, the assembly 3 is substantially C-shaped. It could, however, be of any other known shape. The half-windings L1 and L2 are wound on the stator magnetic circuit 3 in opposite directions. They may be constituted by a single, uninterrupted, insulated conductor wire, and in this case, the point 4 represents a central tap of the winding as a whole formed by the half-windings L1 and L2. Alternatively, the half-windings L1 and L2 may be formed separately and then connected at the point 4.

In the embodiment shown by way of example, a position-detecting device, generally indicated 5 in FIG. 1, is associated with the rotor 2 of the motor 1. This device can provide electrical driving signals in dependence on the instantaneous angular position of the rotor 2.

In the embodiment shown, the position-detecting device 5 comprises a disk 6 fixed for rotation with the rotor 2. An arc sector 7 of opaque material extending through an angle, for example, of 120°, extends on one face of the disk 6. The device 5 also comprises two photoemitter/photodetector pairs, indicated 8 and 9, disposed in respective fixed positions along the path of the sector 7, for example, spaced 180° apart. The pair 8 comprises a photodiode (an emitter) PD1 and an associated phototransistor (or receiver photodiode) PT1, disposed facing one another on opposite sides of the path of the opaque sector 7.

Similarly, the pair 9 comprises a photodiode (an emitter) PD2 and an associated phototransistor (or receiver photodiode) PT2.

The half-windings L1, L2, as well as the photodiodes PD1, PD2 and the phototransistors PT1 and PT2 are connected to a driver circuit, generally indicated 10 in FIG. 1. This circuit has a pair of terminals A and B for connection to an alternating supply voltage, for example, to the electrical supply mains.

Figure 2:
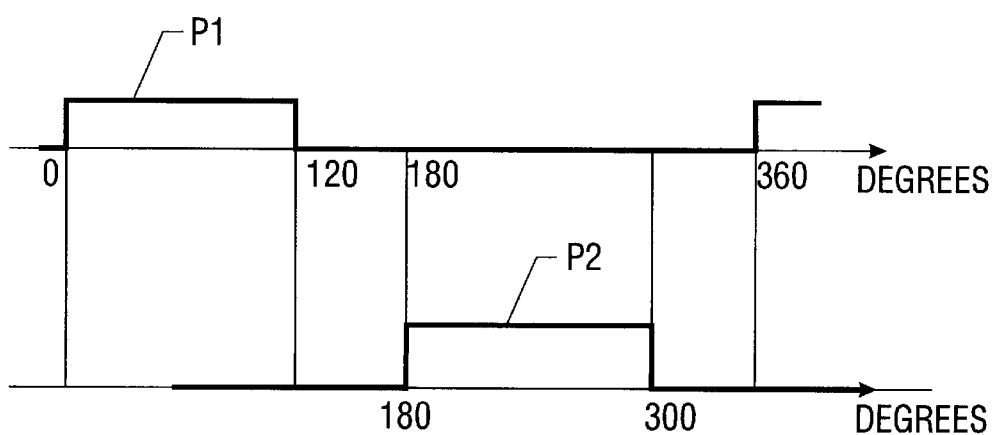
FIG. 2 is a series of two graphs showing examples of the behaviour of signals supplied by position sensors associated with the rotor of the motor according to FIG. 1.

FIG. 2 shows the behaviour of the signals P1 and P2 supplied by the phototransistors PT1 and PT2 in the course of one complete electrical revolution (360°) of the rotor 2, and hence of the disk 6, performed clockwise from the starting position shown in FIG. 1, assuming—as indicated above—that the opaque sector 7 extends through an angle of 120°.

Figure 3:
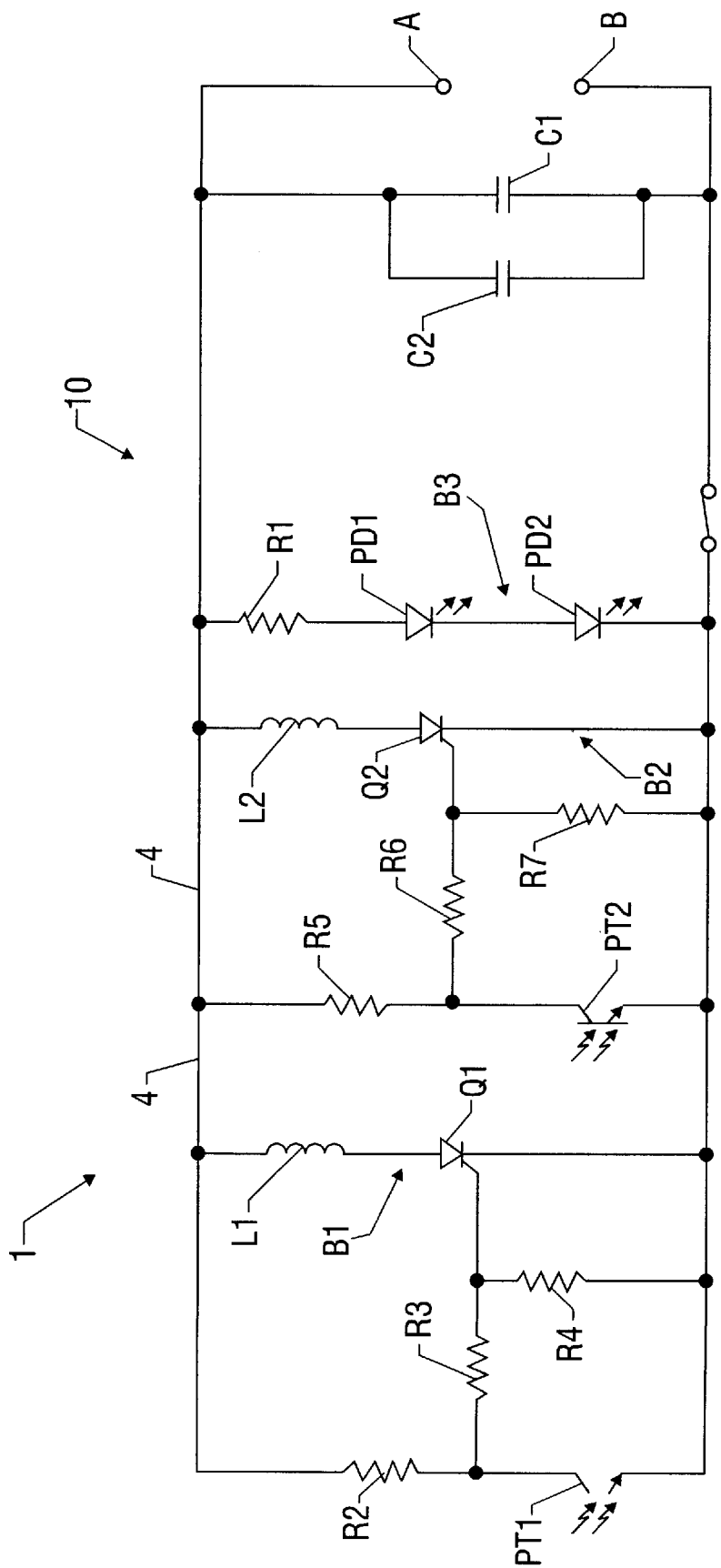
FIG. 3 is a detailed circuit diagram of an electric motor according to the invention.

FIG. 3 shows a detailed diagram of an embodiment of the driver circuit 10.

In the embodiment illustrated, this circuit comprises a first silicon-controlled rectifier (SCR) and a second SCR, indicated Q1 and Q2, connected substantially in series with the first half-winding L1 and with the second half-winding L2, respectively, in respective circuit branches B1 and B2 connected in parallel between the supply terminals A and B.

The photodiodes PD1 and PD2 are connected in series with one another and with a resistor R1 in a further circuit branch B3 connected in parallel between the terminals A and B.

The phototransistor PT1 has its emitter connected to the terminal B and its collector connected to the terminal A via a resistor R2, and to the gate of Q1 via a resistor R3. A resistor R4 is connected between the gate of Q1 and the terminal B.

Similarly, the phototransistor PT2 has its emitter connected to the terminal B and its collector connected to the terminal A via a resistor R5 and to the gate of Q2 via a resistor R6. A resistor R7 is connected between the gate of Q2 and the terminal B.

Two filtering capacitors C1 and C2 are also connected between the terminals A and B.

The operation of the synchronous electric motor according to FIGS. 1 and 3 will now be described with reference also to the graphs shown in FIG. 4.

Figure 4:
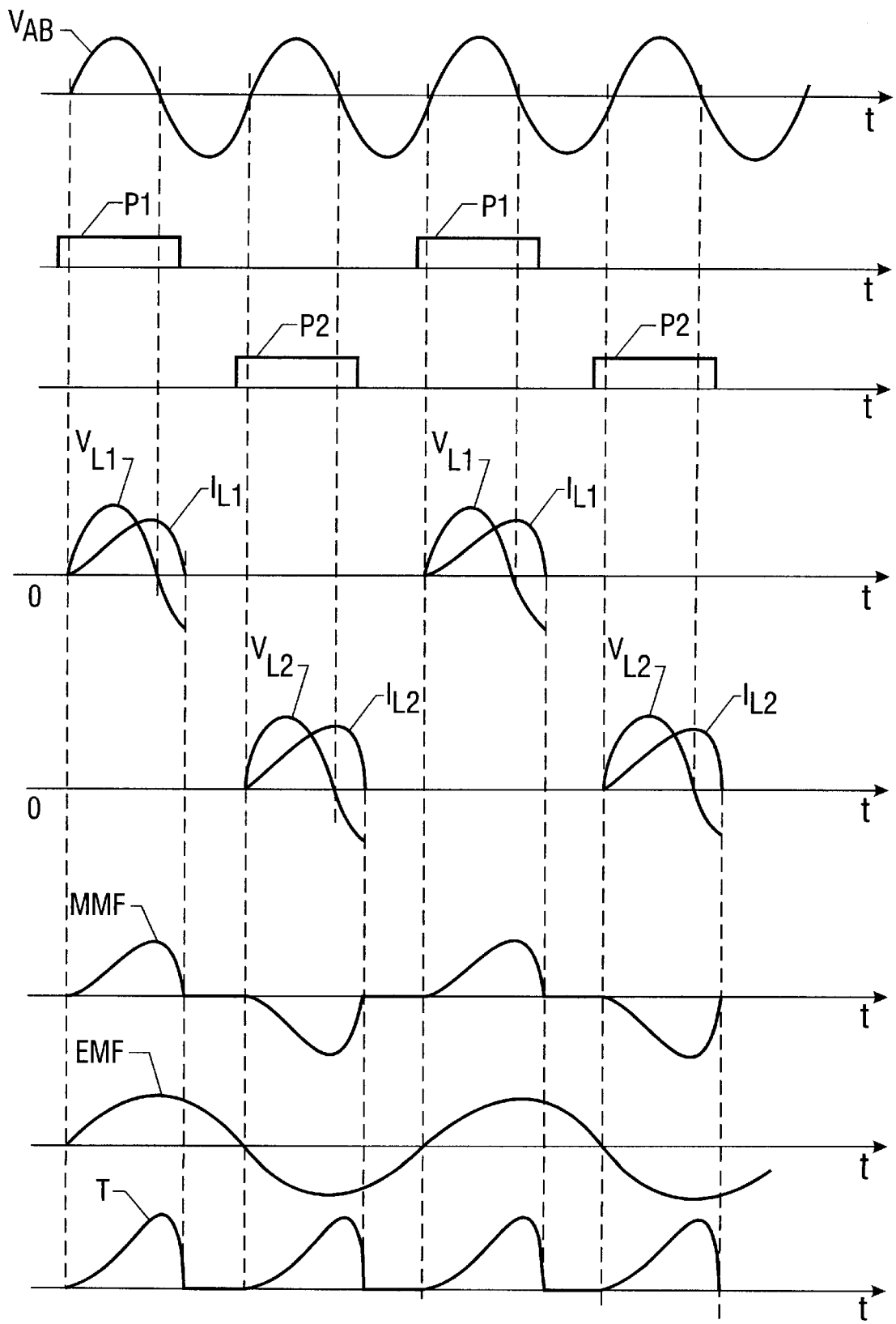
FIG. 4 is a series of graphs showing, as functions of the time t shown in the abscissa, qualitative examples of curves of electrical, electromagnetic and mechanical quantities relating to the motor according to the invention during steady-state operation.

The graphs of FIG. 4 show the curves of a plurality of quantities during steady-state operation (that is, when the rotor 2 of the motor is rotating at synchronism speed).

In FIG. 4, the curve of the alternating supply voltage applied between the terminals A and B is indicated $V_{AB}$. The enabling signals of the phototransistors PT1 and PT2 are indicated P1 and P2.

With the curves shown by way of example in FIG. 4, when the opaque sector 7 intercepts the radiation between the photodiode PD1 and the phototransistor PT1, the collector of the latter is brought to "high" level. Q1 is correspondingly made conductive as soon as a positive half-wave of the voltage $V_{AB}$ starts. When Q1 becomes conductive, a voltage $V_{L1}$ substantially corresponding to the voltage $V_{AB}$ is applied to the half-winding L1. A current, indicated $I_{L1}$ in FIG. 4, which is phase-shifted with a delay relative to the voltage $V_{L1}$, correspondingly flows in the half-winding L1. The controlled diode Q1 is cut off as soon as the current $I_{L1}$, becomes zero. When this occurs, the voltage $V_{L1}$, which in the meantime has become negative, ceases.

As soon as the opaque sector 7 intercepts the radiation between the photodiode PD2 and the phototransistor PT2, the collector of PT2 changes to "high" level. The controlled diode Q2 then becomes conductive as soon as a positive half-wave of the supply voltage $V_{AB}$ arrives. A voltage $V_{L2}$, the curve of which corresponds substantially to that of the voltage $V_{AB}$ is thus localized in the half-winding L2 and a current $I_{L2}$ which is phase-shifted with a delay relative to the voltage $V_{L2}$ flows in this half-winding, as indicated in the fifth graph of FIG. 4. The controlled diode Q2 remains conductive until the current $I_{L2}$ becomes zero. When this occurs, the controlled diode Q2 is cut off and the voltage in the half-winding L2 ceases.

During steady-state operation, respective unidirectional currents $I_{L1}$ and $I_{L2}$ having a frequency equal to half of the frequency of the alternating supply voltage $V_{AB}$ thus flow through the half-windings L1 and L2.

The sixth graph of FIG. 4 shows qualitatively the curve of the magnetomotive force MMF relating to the entire winding formed by the half-windings L1 and L2. As is known, the magnetomotive force is proportional to the current intensity. Since the half-windings L1 and L2 are wound on the same magnetic circuit in opposite directions, the magnetomotive force MMF has a curve with half-waves alternately of opposite sign, with a frequency of half of the frequency of the supply voltage $V_{AB}$, as shown in the sixth graph of FIG. 4.

The seventh graph of FIG. 4, on the other hand, shows the curve of the electromotive force EMF developed as a result of the rotation of the rotor 2. It also has a frequency which is half the frequency of the supply voltage $V_{AB}$.

The last graph of FIG. 4 shows qualitatively the curve of the torque T developed by the motor which—as is known—is substantially proportional to the product of the magnetomotive force MMF and the electromotive force EMF.

Although the motor described above has only one pair of poles, it rotates with a synchronism speed equal to that of a corresponding synchronous motor having two pairs of poles, and hence at a speed reduced by half.

The motor described above thus behaves as a synchronous electric motor with 4 poles although it has a rotor with two poles and a stator which differs from that of a normal two-pole motor purely in that the two half-windings are wound in opposite directions.

The invention thus enables a motor with the performance of a normal motor with four poles to be produced simply by a modification of the stator portion of a normal two-pole motor, with clear advantages from an industrial point of view.

Naturally, the principle of the invention remaining the same, the forms of embodiment and the details of construction may be varied widely with respect to those described and illustrated purely by way of non-limiting example, without thereby departing from the scope of the invention as defined in the appended claims.

In particular, the invention is not intended to be limited to electric motors with a single pair of poles. In fact, the invention enables motors with performance corresponding to that of normal motors with 2 p pairs of poles to be produced with the use of a rotor with p pairs of poles.

Moreover, the invention is not limited to motors in which the angular position of the rotor is detected by optical sensors. For example, amongst the various possible alternative solutions are devices using Hall-effect sensors.

What is claimed is:

1. A single-phase, synchronous electric motor comprising:

a rotor with permanent magnets, with at least one pair of poles, a stator having a winding wound around a magnetic circuit, position-detecting means associated with the rotor for providing driving signals in dependence on the angular position of the rotor, and a driver circuit connected to the detecting means and to the stator winding and having a pair of terminals for connection to an alternating-current voltage supply, the driver circuit being arranged to control the flow of current in the stator winding in dependence on the signals supplied by the position-detecting means, said winding being divided into a first half-winding and a second half-winding connected to one another and wound around the magnetic circuit in opposite directions, and in that the driver circuit comprises first and second controlled-conduction means connected in series with the first stator half-winding and with the second stator half-winding, respectively, in respective circuit branches connected substantially in parallel between the supply terminals, the first and second controlled-conduction means having respective control inputs connected to the position-detecting means in an arrangement such that, during steady-state operation, respective unidirectional currents having a frequency equal to half of the frequency of the alternating supply voltage flow through the half-windings alternately.

2. A motor according to claim 1, wherein the controlled-conduction means comprise two SCRs or equivalent devices.

3. A motor according to claim 1, wherein the position-detecting means comprise a rotary member fixed to the rotor and carrying an opaque screen, and a first and a second photoemitter/photodetector pair disposed in respective fixed positions along the path of the screen.

4. A motor according to claim 1, wherein the position-detecting means comprise Hall-effect sensors.

5. A single-phase, synchronous electric motor, comprising:

a rotor having a number P of poles;

a stator having a winding, the winding being divided into first and second half windings wound in opposite directions;

a rotor position detector operable to output signals indicative of the angular position of the rotor relative to the stator;

a driver circuit connected to receive the rotor position detector output signals and being connectable to an alternating-current voltage supply to control the flow of current in the winding in response to the rotor position detector output signals, such that the motor achieves a synchronism rate of revolution equal to that of a motor having 2P poles.

6. A motor according to claim 5, wherein the driver circuit includes first and second switches connected to the first and second half windings, respectively, to control current flow through the windings, the first and second switches each having gate terminals connected to be responsive to the rotor position detector output signals and the current in the winding.

7. A motor according to claim 6, wherein the rotor position detector comprises:

a disk fixed for rotation with the rotor, the disk having an arc sector of opaque material thereon extending through an angle; and first and second photoemitter/photodetector pairs disposed in respective fixed positions along the path of the arc sector of opaque material, such that the arc sector of opaque material rotates past the first and second photoemitter/photodetector pairs.

8. A motor according to claim 7, wherein the first and second photoemitter/photodetector pairs are positioned 180° apart.

9. A motor according to claim 6, wherein the first and second switches comprise SCRs.

10. A motor according to claim 8, wherein the first and second photoemitter/photodetector pairs each comprise respective photodiodes and phototransistors.

11. A motor according to claim 8, wherein the wherein the first and second switches comprise SCRs, and wherein the first and second phototransistors each have a collector terminal connected to a gate terminal of the respective SCR.

* * * * *